Jan. 26, 1954 W. W. MAHER 2,667,138
LIQUID ADHESIVE APPLYING MECHANISM WITH PISTON FEED
Filed Aug. 23, 1949
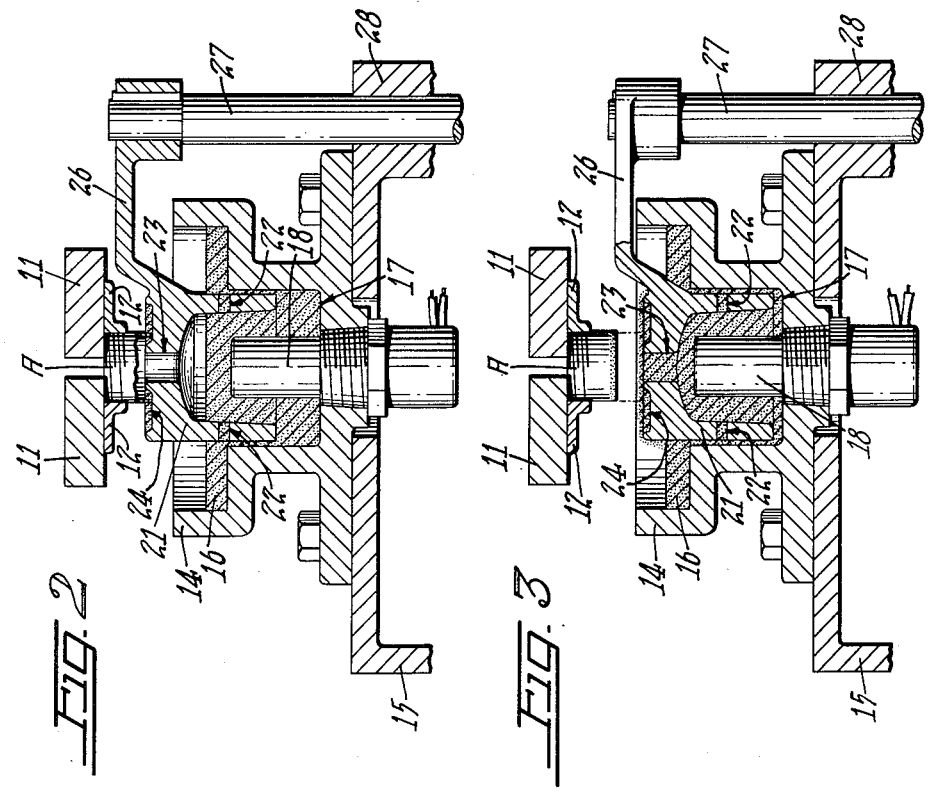
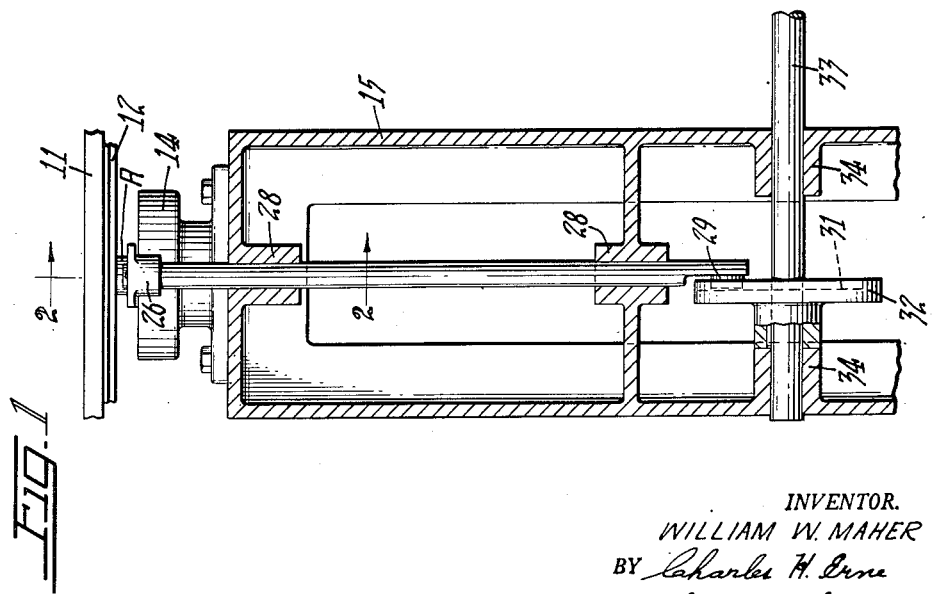
INVENTOR.
WILLIAM W. MAHER
BY
ATTORNEYS Patented Jan. 26, 1954

2,667,138

UNITED STATES PATENT OFFICE 2,667,138

LIQUID ADHESIVE APPLYING MECHANISM WITH PISTON FEED

William W. Maher, San Francisco, Calif., assignor to American Can Company, New York, N. Y., a corporation of New Jersey Application August 23, 1949, Serial No. 111,854

4 Claims. (Cl. 113—93)

The present invention relates to machines for securing fittings such as nozzles, spouts, bail ears, handles and similar articles to other articles such as cans or containers and has particular reference to devices for immersing the fittings into a bath of molten solder or other adhesive to deposit on the fittings a predetermined amount of the solder or adhesive prior to their attachment to the articles.

This is a companion to my co-pending United States applications Serial No. 111,852 filed August 23, 1949, on Machine for Applying Uniting Materials to Articles and for Assemblying Them Together, and Serial No. 111,853 filed August 23, 1949, Patent No. 2,619,064 granted November 25, 1952, on Fluxing Mechanism with Movable Flux Applying Device.

The invention contemplates more particularly the provision of a mechanism for applying molten solder to prefluxed container nozzles preparatory to the nozzles being assembled with containers for sweating thereto although the invention is equally well adapted to applying other fluid uniting materials to other fittings or articles as desired.

An object of the invention is the provision of a mechanism for applying fluid adhesive materials to fittings and other articles wherein the amount of the fluid material and its application to the fittings and other articles may be readily controlled under high speed operating conditions.

Another object is the provision of such a mechanism wherein only clear or clean material free of any scum or oxidation which usually gathers on the surface of a bath of such materials, is applied to the fittings or other articles.

Numerous other objects and advantages of the invention will be apparent as it is better understood from the following description, which, taken in connection with the accompanying drawings, disclosed a preferred embodiment thereof.

Referring to the drawings:

Figure 1 is a combination section and side elevation of a mechanism embodying the instant invention, with parts broken away; and Figs. 2 and 3 are enlarged sectional views taken substantially along the line 2—2 in Fig. 1, the two views showing different positions of certain movable parts of the mechanism, parts being broken away.

As a preferred or exemplary embodiment of the instant invention the drawings illustrate a mechanism for solder coating sheet metal nozzles or spots A to prepare them for subsequently sweating onto sheet metal containers to produce the well known pouring nozzle type of container. In accordance with the instant invention this solder coating of the nozzles, after they have been prefluxed in any suitable manner, is effected by immersing their lower ends to a predetermined depth, into a segregated amount of molten solder while the nozzles are held stationary in a suspended relation.

Any suitable device may be used for holding the nozzles in this suspended position. For this purpose the drawings show a pair of spaced and parallel, horizontally disposed bar magnets 11, of either the permanent or electromagnet type and having a pair of spaced and parallel guide rails 12 secured to the lower faces thereof for locating the nozzles and for guiding them along a predetermined path of travel, as desired.

The mechanism comprises a solder tank 14 which is located adjacent or under the bar magnets 11 and which is secured to a frame 15 which may be the main frame of a more eleborate machine. The tank 14 contains a bath of molten solder 16. The top of the tank is open. This solder tank is formed with a relatively deep cylindrical well or recess 17 which is maintained full of molten solder. The solder is maintained in this molten condition by an electric heating element 18 which is disposed in the bottom of the well.

The solder well 17 houses a vertically movable hollow piston or cup 21 which is slightly less in diameter than the inside diameter of the well. The bottom of the piston is open. The side wall of the piston is formed with a plurality of inlet ports 22 which are located so that in the raised position of the piston as shown in Fig. 2 the ports will be above the top edge of the well but still submerged in the molten solder and in the lowered position of the piston as shown in Fig. 3 the ports will be below the top edge of the well. The top wall of the piston is formed with an outlet port 23 which is surrounded by a shallow dipping recess or reservoir 24 of a depth equal to the height of the solder to be applied to the nozzle held suspended over the recess.

Hence when the piston 21 moves down into the well 17, the inlet ports 22 move down below the top edge of the well and thereby cut off communication between the interior of the piston and the solder surrounding the piston in the tank 14. Continued downward movement of the piston compresses the solder confined within the piston and forces it upwardly through the outlet port 23 where it overflows into the dipping recess or reservoir 24 to keep this recess filled as best shown in Fig. 3. Any excess solder overflows the outer edge of the piston and falls back into the solder tank 14. In this manner only clean solder, confined within the piston 21 and raised from below the surface of the solder is supplied to and segregated in the dipping recess 24. Thus the scum or sludge which usually gathers on the surface of the solder is prevented from mixing with the solder and from being fed to the dipping recess.

On the up stroke of the piston 21, it carries the clean solder in the dipping recess 24 up toward the suspended nozzle A and immerses the lower prefluxed end of the nozzle into the molten solder to substantially the full depth of the dipping recess 24 as best shown in Fig. 2. During this up stroke of the piston, the inlet ports 22 in the side wall thereof move up with the piston above the top edge of the well 17 and thus permit molten solder from the solder tank 14 to flow into the space inside the piston to replenish the solder that was forced out through the outlet port 23 as explained above. In this manner a predetermined amount of molten solder is applied to the fluxed end of the nozzle A for a predetermined height without any wasting of the solder.

Vertical movement of the piston 21 is effected preferably by cam action. For this purpose the piston 21 is formed with an outwardly extending arm 26 which projects beyond the solder tank 14 and is mounted on the upper end of a vertical actuating rod 27. The rod is carried in slide bearings 28 formed in the frame 15. The lower end of the rod carries a cam roller 29 which operates in a cam groove 31 of a face cam 32 mounted on a driving shaft 33 journaled in bearings 34 formed in the frame 15. The shaft is rotated in any suitable manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A mechanism for applying solder or other adhesive to articles such as container nozzles and the like, the combination of a support for holding an article for application of solder, a solder tank containing a supply of molten solder located below said support, said tank at the bottom being formed with a vertically disposed cylindrical well, a hollow cylindrical piston of smaller diameter than said well and open at the bottom said piston being partially immersed in the solder in the tank, an applicator reservoir formed in the top of said piston and at all times above the solder in the tank, horizontal inlet ports extending through the cylindrical wall of said piston and vertically spaced above its bottom edge and below said applicator reservoir, a central vertical outlet port in said piston connecting said reservoir with the hollow interior at the bottom of said piston, and actuating means for reciprocating said piston, said means lowering the piston to position said inlet ports below the top of said well to confine and to impart pressure to the solder therein to force the solder through said outlet port into said reservoir, said actuating means also raising the piston to carry the solder in said reservoir up to said supported article for applying solder to the article by immersing that part of the article which is to be soldered.

2. In a mechanism for applying solder to articles, the combination comprising a support for holding an article, a tank containing molten solder below said support, the bottom of said tank having a well formed therein, a hollow piston open at the bottom, said piston being partially immersed in the solder in said tank and having a wall slightly smaller than said well in transverse dimension and extending into said well for vertical reciprocable movement therein, a reservoir in the top of said piston to hold a quantity of solder isolated at all times above the solder in said tank and below said support, an inlet port in said wall of the piston and extending above said well when the piston is in raised position for conducting solder from the tank above said well into said well, an outlet port in the top wall of said piston for conducting solder upwardly from said well to fill and overflow said reservoir, and means for vertically reciprocating said piston in the well, said reciprocating means lowering said piston and said inlet port into the well to pump solder from the well upwardly through said outlet port to replenish and overflow said reservoir and to raise said piston to apply solder from said filled reservoir onto the article held on said support.

3. A mechanism for applying solder or other adhesive to articles such as container nozzles and the like, the combination of a support for holding an article for application of solder, a solder tank containing a supply of molten solder located below said support, said tank at the bottom being formed with a vertically disposed well, a hollow piston of smaller transverse dimension than said well and open at the bottom, said piston being partially immersed in and extending above the solder in the tank, an applicator reservoir formed in the top of said piston and at all times above the solder in the tank, a central vertical outlet port in said piston connecting said reservoir with the hollow interior at the bottom of said piston, and actuating means for reciprocating said piston, said means lowering the piston in said well to confine and to impart pressure to the solder therein to force the solder through said outlet port into said reservoir, said actuating means also raising the piston to admit solder to said well from the tank above and to carry the solder in said reservoir up to said supported article for applying solder to the article by immersing that part of the article which is to be soldered.

4. A mechanism for applying solder or other adhesive to articles such as container nozzles and the like, the combination of a support for holding an article for application of solder, a solder tank containing a supply of molten solder located below said support, said tank at the bottom being formed with a well, a hollow piston of smaller transverse dimension than said well and open at the bottom, said piston being partially immersed in and extending above the solder in the tank, an applicator reservoir formed in the top of said piston and at all times above the solder in the tank, an inlet port extending through the wall of said piston to the hollow interior thereof below said applicator reservoir, a central vertical outlet port in said piston connecting said reservoir with the hollow interior at the bottom of said piston, and actuating means for reciprocating said piston in said well, said means lowering the piston to position said inlet port below the top of said well to confine and to impart pressure to the solder therein to force the solder through said outlet port into said reservoir, said actuating means also raising the piston to admit solder to said well through said inlet port and to carry the solder in said reservoir up to said supported article for applying solder to the article.

WILLIAM W. MAHER.

References Cited in the file of this patent

UNITED STATES PATENTS

| Number | Name | Date |
|---|---|---|
| 134,953 | Ward | Jan. 14, 1873 |
| 705,336 | Furber | July 22, 1902 |
| 812,329 | Daugherty | Feb. 13, 1906 |
| 1,055,028 | Flynn | Mar. 4, 1913 |
| 1,103,067 | McColl | July 14, 1914 |
| 1,783,642 | Ferguson | Dec. 2, 1930 |
| 2,182,364 | Smith | Dec. 5, 1939 |
| 2,195,670 | Fernglen | Apr. 2, 1940 |